(12) United States Patent
Dong et al.

(10) Patent No.: US 8,749,546 B2
(45) Date of Patent: Jun. 10, 2014

(54) APPARATUS AND METHODS FOR PROCESSING DIGITAL 3D OBJECTS

(75) Inventors: Susan Dong, Renwu Township, Kaohsiung County (TW); Ren-Dar Yang, Hsinchu (TW); Tzu-Chieh Tien, Pingjhen (TW); Te-Lu Tsai, Taipei (TW); Yu-Shiang Hung, Taipei (TW)

(73) Assignee: Institute for Information Industry, Taipei (TW)

( * ) Notice: Subject to any disclaimer, the term of this patent is extended or adjusted under 35 U.S.C. 154(b) by 797 days.

(21) Appl. No.: 12/966,567

(22) Filed: Dec. 13, 2010

(65) Prior Publication Data

US 2012/0120053 A1    May 17, 2012

(30) Foreign Application Priority Data

Nov. 12, 2010  (TW) ................................ 99138934 A

(51) Int. Cl.
*G06T 15/00* (2011.01)
*G06T 13/00* (2011.01)
*G06F 3/048* (2013.01)

(52) U.S. Cl.
USPC ........... 345/419; 345/473; 715/764; 715/848; 715/852

(58) Field of Classification Search
None
See application file for complete search history.

(56) References Cited

U.S. PATENT DOCUMENTS

2007/0229496 A1*  10/2007  Adams .......................... 345/419
2008/0270947 A1*  10/2008  Elber et al. ..................... 715/852

FOREIGN PATENT DOCUMENTS

CN         101595510 A      12/2009

OTHER PUBLICATIONS

Kenton McHenry and Peter Bajcsy, "An Overview of 3D Data Content, File Formats and Viewers", National Center for Supercomputing Applications, University of Illinois at Urbana-Champaign, Urbana, IL, Oct. 31, 2008, http://isda.ncsa.uiuc.edu/peter/publications/techreports/2008/NCSA-ISDA-2008-002.pdf.*

* cited by examiner

*Primary Examiner* — Tize Ma
(74) *Attorney, Agent, or Firm* — Birch, Stewart, Kolasch & Birch, LLP

(57) ABSTRACT

A digital 3D object processing apparatus is provided, for processing a digital 3D object comprising a plurality of sub-objects belonging to one of a plurality of digital 3D object formats, comprising: a communication unit coupled to a first outer computer through a network; an interface unit coupled to the communication unit, receiving an instruction from the first outer computer; and a control command unit coupled to the communication unit, transmitting a control command to the first outer computer, wherein the first outer computer establishes a relative position of the plurality of sub-objects according to the control command, and transmits the relative position and the plurality of sub-objects to the communication unit.

16 Claims, 3 Drawing Sheets

APPARATUS AND METHODS FOR PROCESSING DIGITAL 3D OBJECTS

CROSS REFERENCE TO RELATED APPLICATIONS

This Application claims priority of Taiwan Patent Application No. 99138934, filed on Nov. 12, 2010, the entirety of which is incorporated by reference herein.

BACKGROUND OF THE INVENTION

1. Field of the Invention

The disclosure generally relates to apparatuses and methods for processing digital 3D (three dimensions) objects, and more particularly to apparatuses and methods for processing digital 3D objects comprising a plurality of sub-objects for transmission.

2. Description of the Related Art

Now, digital 3D objects often appear in online games, product/model shows, and space shows, etc., letting them more immersive.

To avoid issue of servers, users are supposed to backup, copy, or transfer digital 3D objects to their own computers for 3D gaming. The amount of data for digital 3D objects is usually large. For transmission, the size of a digital 3D object is limited, and transmission rate is slow. Traditionally, digital 3D objects are often divided into many smaller objects and transmitted separately. However, after being transmitted, there is no record of the relative positions of the smaller objects, so users must combine the smaller objects by themselves, which is inconvenient for users.

Currently, there is no apparatus or service for the uploading, downloading, exchange, or trading of digital 3D objects. For example, a buyer and a seller must register on the same server when they want to trade or exchange a digital 3D object, e.g., a virtual weapon or a virtual armor, of an online game. Meanwhile, gaming systems and gaming developers usually adopt different 3D file formats, e.g., 3D MAX or MAYA. Therefore, digital 3D objects can not be transferred among different gaming systems.

BRIEF SUMMARY OF THE INVENTION

In one exemplary embodiment, a digital 3D object processing apparatus for processing a digital 3D object is disclosed, comprising a plurality of sub-objects belonging to one of a plurality of digital 3D object formats. The digital 3D object processing apparatus comprises: a communication unit coupled to a first outer computer through a network; an interface unit coupled to the communication unit and receiving an instruction from the first outer computer; and a control command unit coupled to the communication unit and transmitting a control command to the first outer computer, wherein the first outer computer establishes a relative position of the plurality of sub-objects according to the control command, and transmits the relative position and the plurality of sub-objects to the communication unit.

In another exemplary embodiment, a digital 3D object processing method for processing a digital 3D object is disclosed, comprising a plurality of sub-objects belonging to one of a plurality of digital 3D object formats. The digital 3D object processing method comprises: receiving, by a digital 3D object processing apparatus, an instruction from a first outer computer; transmitting, by the digital 3D object processing apparatus, a control command to the first outer computer; establishing, by the first outer computer, a relative position of the plurality of sub-objects according to the control command; and transmitting, by the first outer computer, the relative position and the plurality of sub-objects to the digital 3D object processing apparatus.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
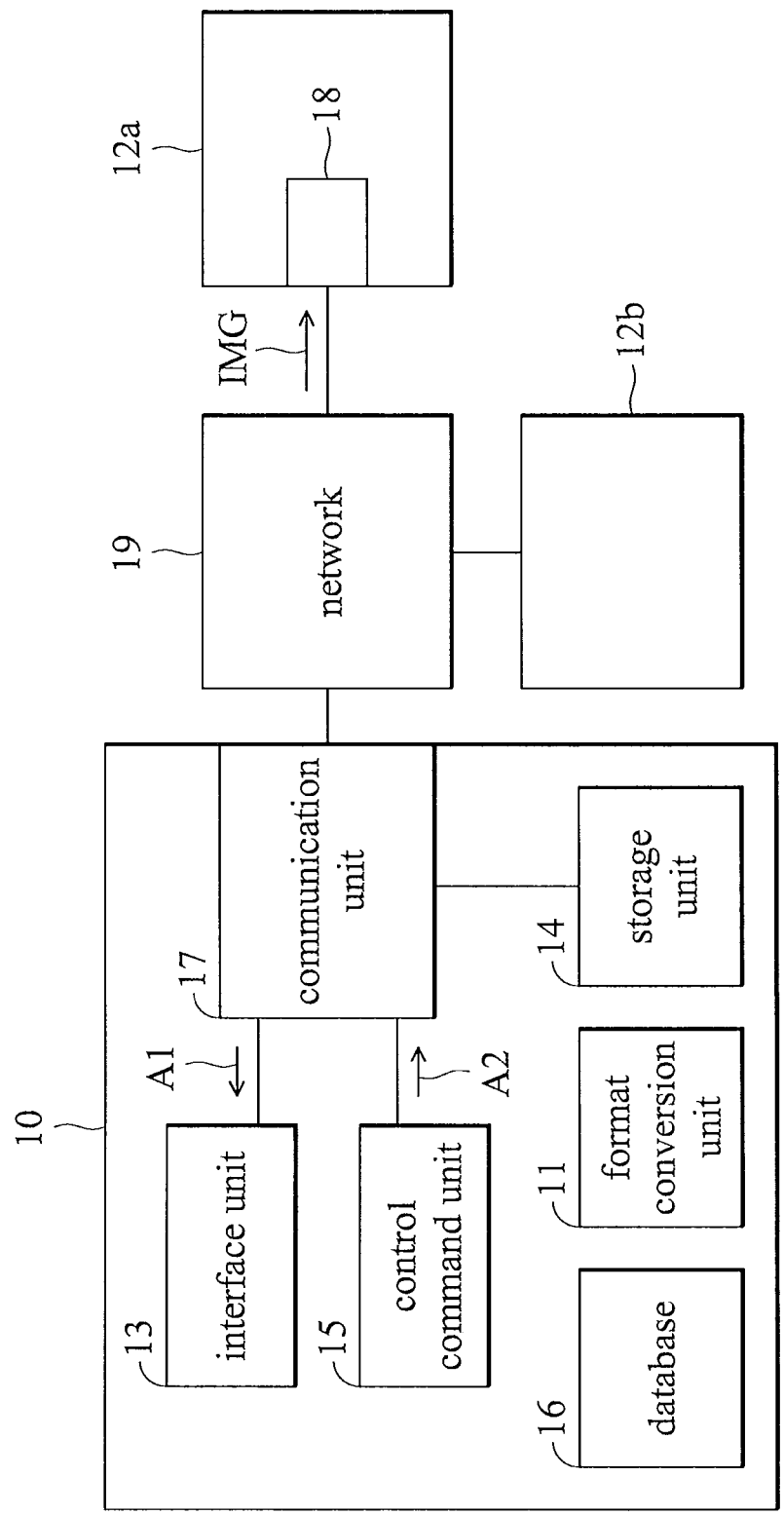
FIG. 1 is a diagram illustrating a digital 3D object processing apparatus, consistent with certain disclosed embodiments.

FIG. 1 is a diagram illustrating a digital 3D object processing apparatus 10, consistent with certain disclosed embodiments. The digital 3D object processing apparatus 10 may be a server, a computer, or a notebook. In one exemplary embodiment, the digital 3D object processing apparatus 10 of FIG. 1 may comprise a format conversion unit 11, an interface unit 13, a storage unit 14, a control command unit 15, a database 16, and a communication unit 17. The format conversion unit 11 may be used to convert a digital 3D object from one digital 3D object format to another digital 3D object format. The interface unit 13 may be a web or an application programming interface, API. The storage unit 14 may be configured to store data. The control command unit 15 may be a processor or an integrated circuit to execute a specific computer program or software. Note that only components related to what is claimed are shown in the specification and figures.

As shown in FIG. 1, the communication unit 17 of the digital 3D object processing apparatus 10 is connected to an outer computer 12*a* through a network 19. The outer computer 12*a* may transmit an instruction A1, through the network 19 and the communication unit 17, to the interface unit 13 of the digital 3D object processing apparatus 10. After receiving the instruction A1, the digital 3D object processing apparatus 10 may transmit a control command A2 to the outer computer 12*a*. The outer computer 12*a* may establish a relative position of a plurality of sub-objects of a digital 3D object according to the control command A2, and transmit the relative position and the plurality of sub-objects to the communication unit 17. Moreover, the digital 3D object processing apparatus 10 may edit the digital 3D objects according to the instruction A1, for example, by combining a plurality of digital 3D objects, dividing one digital 3D object into a plurality of sub-objects, modifying assets of a digital 3D object, or obtaining parts of one or more digital 3D objects to constitute new digital 3D objects. A plurality of digital 3D objects and sub-objects received or edited by the digital 3D object processing apparatus 10 can be stored in the database 16. The database 16 can store the objects in the storage unit 14, or in another independent device, e.g., a server, a computer, electrically connected to the control command unit 15 and the communication unit 17.

In detail, the control command unit 15 transmits a control command A1, through the communication unit 17 and the network 19, to the outer computer 12*a*. The digital 3D object processing apparatus 10 is configured to process a digital 3D object. The digital 3D object may comprise a plurality of sub-objects that belong to one of a plurality of digital 3D object formats, e.g., 3D MAX format, MAYA format. The outer computer 12a may receive the digital 3D object from the digital 3D object processing apparatus 10, and establish an application programming interface 18 according to the control command A2. Then, the outer computer 12a may establish a relative position of the plurality of sub-objects and 3D representation of geometric data, e.g., a digital 3D object composed of two sub-objects, wherein one of the sub-objects, a vase, is on the other sub-object, a desk, through the application programming interface 18 according to the control command A2. The outer computer 12a may transmit the plurality of sub-objects, the relative position, and the 3D representation of geometric data to the communication unit 17 of the digital 3D object processing apparatus 10. The storage unit 14 is connected to the communication unit 17 to store the plurality of sub-objects and the relative position. In another embodiment, the plurality of sub-objects may be part of the digital 3D object, and not a complete object, e.g., the sub-object can be part of a vase, like the bottom of the vase.

The format conversion unit 11 can convert the sub-objects from the original digital 3D object format to another digital 3D object format; for example, convert the sub-objects from 3D MAX to MAYA. Moreover, the digital 3D object processing apparatus 10 may provide a preview image IMG of the digital 3D object for the outer computer 12a to preview according to the relative position, the plurality of sub-objects, and the 3D representation of geometric data. In addition, the network 19 can be further connected to another outer computer 12b, which may be another user. The relative position and the plurality of sub-objects can be transmitted by the digital 3D object processing apparatus 10 to the outer computer 12b through the communication unit 17 and the network 19.

For example, the communication unit 17 may be connected to the outer computer 12b through the network 19, the interface unit 13 may receive a preview instruction and a download instruction from the outer computer 12b through the communication unit 17, and the control command unit 15 may transmit a preview image of a digital 3D object to the outer computer 12b according to the preview instruction, e.g., display the preview image of the digital 3D object on a browser or an application operation interface of the outer computer 12b. In order to download digital 3D objects, a download instruction may be provided by the outer computer 12b. The control command unit 15 may transmit the digital 3D objects to the outer computer 12b according to the download instruction. The transmission method can be as that shown in FIG. 2.

In another embodiment, after the digital 3D object processing apparatus 10 receives the instruction A1 from the outer computer, e.g., the outer computer 12a, the control command unit 15 transmits the control command A2 to the outer computer 12a. The control command A2 may allow connection of the outer computer 12a to the outer computer 12b through the network 19, and transmit the plurality of sub-objects and the relative position to the outer computer 12b. Note that there is no need to transmit the plurality of sub-objects and the relative position, and store them in the storage unit 14 of the digital 3D object processing apparatus 10.

Figure 2:
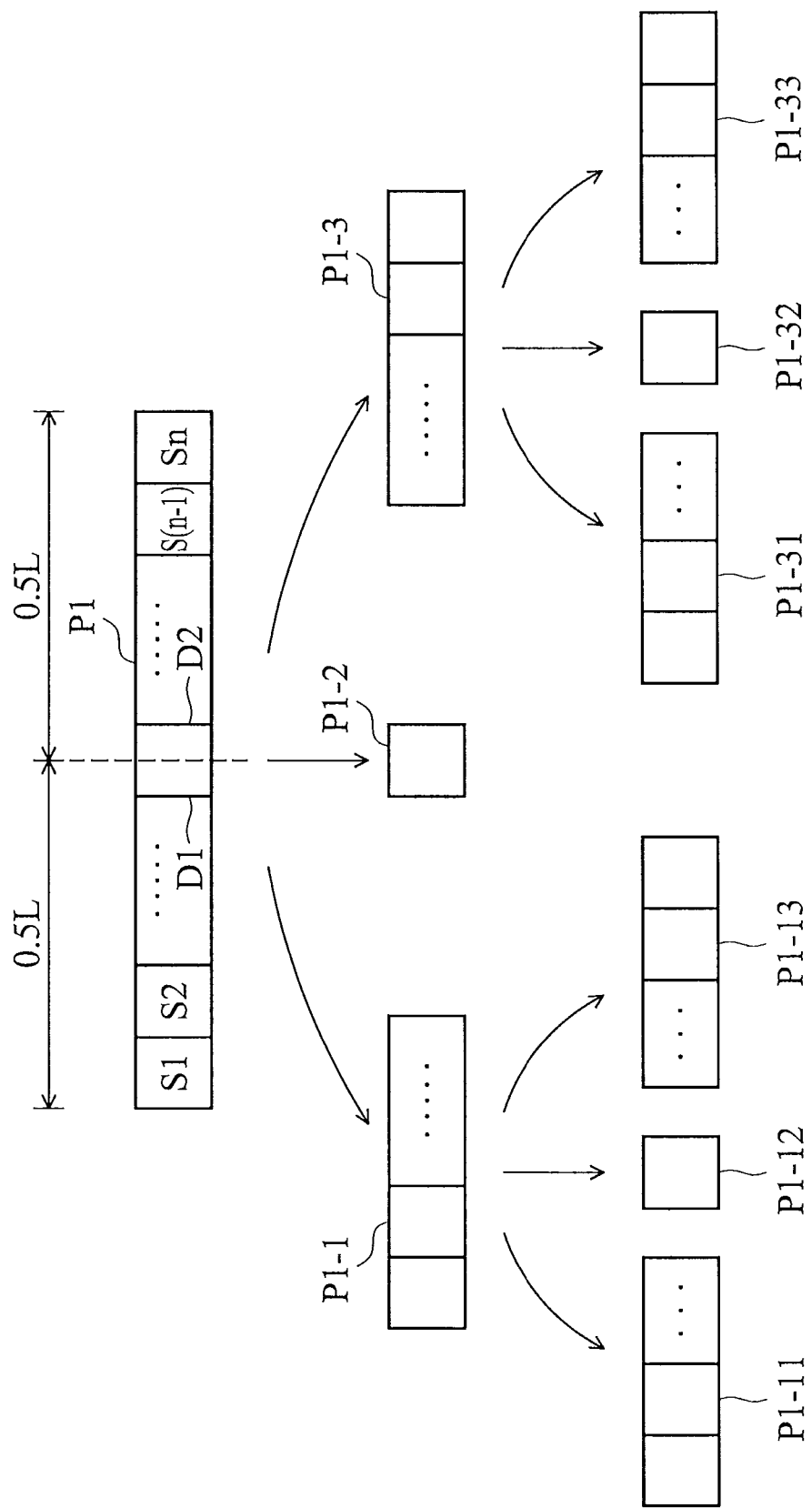
FIG. 2 is a diagram of a data division process, consistent with certain disclosed embodiments.

FIG. 2 is a diagram of a data division process, consistent with certain disclosed embodiments. The control command A2 comprises a data division process that will be set forth in detail. First, at least one of the plurality of sub-objects are taken as processed data P1. The processed data has a data length L and comprises a plurality of data pieces S1, S2, ... , Sn. The plurality of data pieces S1, S2, ..., Sn are separated respectively by a plurality of data partitions. Second, the outer computer 12a identifies a halfway point of the data length L of the processed data P1, junction of two 0.5L data length as shown in FIG. 2, and then searches around the data partitions that are closest to the half of the data length L. As shown in FIG. 2, the data partitions that are the closest to the half the data length L are the data partition D1 and the data partition D2. Therefore, the plurality of data pieces S1, S2, ... , Sn of the processed data P1 are divided into three: a sub-data P1-1 before the data partition D1, a sub-data P1-2 between the data partitions D1 and D2, and a sub-data P1-3 after the data partition D2. Third, the outer computer 12a transmits the sub-data P1-2 including only one data piece (sub-data P1-2) to the digital 3D object processing apparatus 10. Finally, the outer computer 12a takes the sub-data P1-1 and the sub-data P1-3 as the processed data P1 respectively, and repeats the above procedure until all data pieces S1, S2, ... , Sn of the processed data P1 are processed or transmitted. For example, the sub-data P1-1 are further divided into the sub-sub-data P1-11, P1-12, and P1-13; and the sub-data P1-3 are further divided into the sub-sub-data P1-31, P1-32, and P1-33. The sub-sub-data P1-12 and P1-32 are transmitted, and the other sub-sub-data are further divided until all data pieces S1, S2, . . . , Sn of the processed data P1 are processed or transmitted. The data division process can divide the processed data P1 into many sub-data and sub-sub-data, and then transmit or display a digital 3D object. For example, the outer computer 12a can execute the data division process for a digital 3D object before transmitting the digital 3D object. After the outer computer 12a transmits the digital 3D object to the digital 3D object processing apparatus 10, the digital 3D object processing apparatus 10 can execute the data division process for the digital 3D object, and displays the digital 3D object. Or after the digital 3D object processing apparatus 10 transmits the digital 3D object to an outer computer 12b, the outer computer 12b can execute the data division process for the digital 3D object, and displays the digital 3D object. The transmission rate of the digital 3D object can increase and the display rate is faster due to the data division process; especially for digital 3D objects having large amounts of data.

Figure 3:
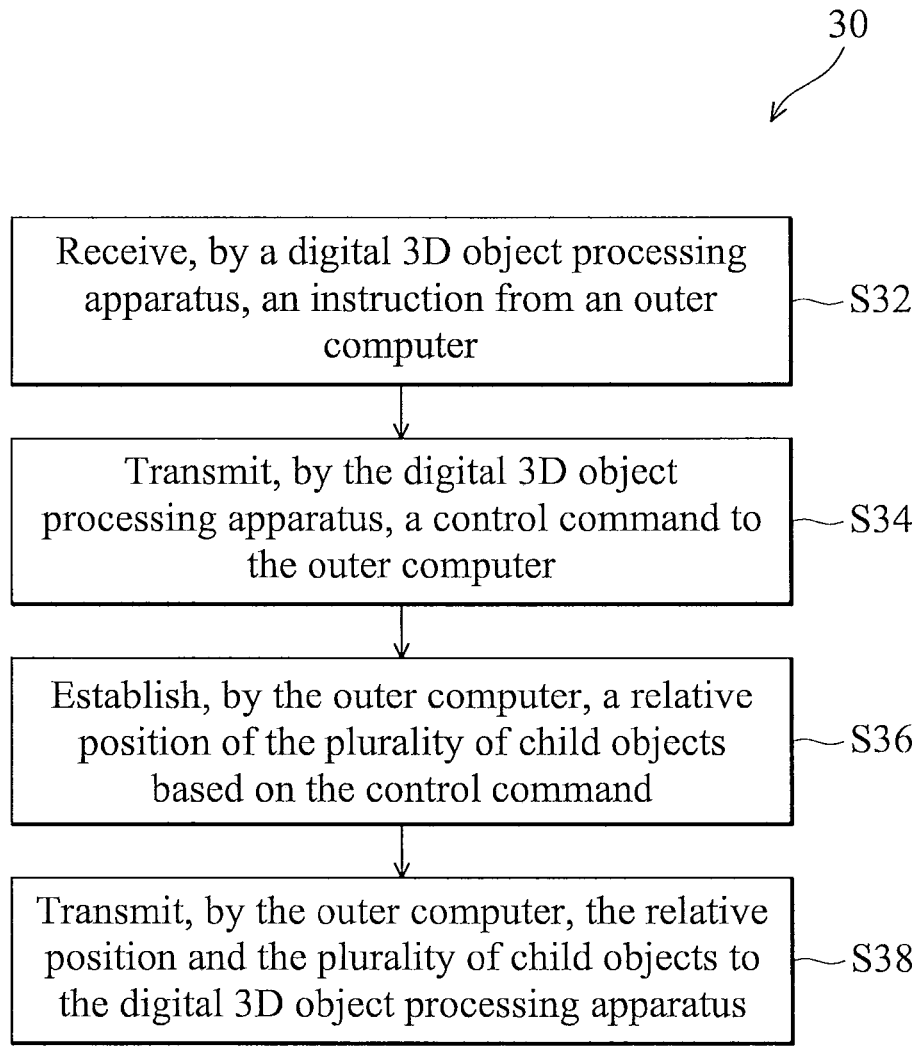
FIG. 3 is a flowchart illustrating a digital 3D object processing method, consistent with certain disclosed embodiments.

FIG. 3 is a flowchart 30 illustrating a digital 3D object processing method, consistent with certain disclosed embodiments. The digital 3D object processing method is for processing a digital 3D object comprising a plurality of sub-objects belonging to one of a plurality of digital 3D object formats, e.g., 3D MAX, MAYA. In step S32, the digital 3D object processing apparatus 10 receives an instruction A1 from the outer computer 12a. In step S34, the digital 3D object processing apparatus 10 transmits a control command A2 to the outer computer 12a, wherein the outer computer 12a may be a server or a personal computer, PC. In step S36, the outer computer 12a establishes a relative position of the plurality of sub-objects according to the control command A2. Finally, in step S38, the outer computer 12a transmits the relative position and the plurality of sub-objects to the digital 3D object processing apparatus 10. The digital 3D object processing apparatus 10 can transmit or receive the digital 3D object by hypertext transfer protocol, http. For example, by using languages such as C, Java, or a mobile phone connected to the Internet through hypertext transfer protocol, anyone can connect to the digital 3D object processing apparatus 10 to upload, browse, or download a digital 3D object.

In conclusion, the digital 3D object processing apparatus 10 can receive a digital 3D object having different kinds of digital 3D object formats, and convert them into a new digital 3D object format. Therefore, digital 3D objects from different gaming systems can be interchanged through the digital 3D object processing apparatus 10, solving the problem where digital 3D object formats can not be shared among different gaming systems. By using the digital 3D object processing apparatus 10, it is not necessary for users to be limited to share or trade digital 3D objects in a same server. Thus, the utility rate of basic digital 3D objects is increased and the time used for constructing gaming backgrounds is decreased. Digital 3D objects may serve as a product, shown and sold by using the digital 3D object processing apparatus 10; thus increasing business opportunities.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A digital three-dimensional (3D) object processing apparatus, for processing a digital 3D object comprising a plurality of sub-objects belonging to one of a plurality of digital 3D object formats, comprising:
    a communication unit coupled to a first outer computer through a network;
    an interface unit coupled to the communication unit, receiving an instruction from the first outer computer; and
    a control command unit coupled to the communication unit, transmitting a control command to the first outer computer,
    wherein the first outer computer establishes a relative position of the plurality of sub-objects according to the control command, and transmits the relative position and the plurality of sub-objects to the communication unit, and
    wherein the control command comprises a data division process, and the data division process comprises:
    taking at least one of the plurality of sub-objects as processed data, wherein the processed data has a data length and comprises a plurality of data pieces that are separated by a plurality of data partitions;
    obtaining a halfway point of the data length of the processed data;
    searching a first data partition and a second data partition of the plurality of data partitions, wherein the first data partition and the second data partition are closest to the half of the data length of the processed data, and the plurality of data pieces of the processed data are divided into a first sub-data before the first data partition, a second sub-data between the first and second data partitions, and a third sub-data after the second data partition; and
    taking the first sub-data and the third sub-data as the processed data respectively, and repeating the above procedure until all data pieces of the processed data have been processed.

2. The digital 3D object processing apparatus of claim 1, wherein the first outer computer establishes 3D representation of geometric data of the plurality of sub-objects according to the control command, and transmits the 3D representation of geometric data of the plurality of sub-objects to the communication unit.

3. The digital 3D object processing apparatus of claim 2, wherein a preview image of the digital 3D object is provided according to the relative position, the plurality of sub-objects, and the 3D representation of geometric data.

4. The digital 3D object processing apparatus of claim 2, wherein the communication unit is further coupled to a second outer computer through the network, and the interface unit further receives a preview instruction and a download instruction from the second outer computer, wherein the control command unit further transmits the preview image and the digital 3D object to the second outer computer according to the preview instruction and the download instruction.

5. The digital 3D object processing apparatus of claim 1, wherein the control command further establishes an application programming interface in the first outer computer, wherein the first outer computer establishes the relative position of the plurality of sub-objects through the application programming interface according to the control command, and transmits the relative position and the plurality of sub-objects to the communication unit.

6. The digital 3D object processing apparatus of claim 1, further comprising:
    a storage unit coupled to the communication unit and storing the relative position and the plurality of sub-objects.

7. The digital 3D object processing apparatus of claim 1, wherein the control command further allows coupling of the first outer computer to a second outer computer through the network, and transmits the relative position and the plurality of sub-objects from the first outer computer to the second outer computer.

8. The digital 3D object processing apparatus of claim 1, further comprising:
    a format conversion unit, converting a first digital 3D object format of the plurality of sub-objects into a second digital 3D object format of the plurality of sub-objects.

9. A digital three-dimensional (3D) object processing method, for processing a digital 3D object comprising a plurality of sub-objects belonging to one of a plurality of digital 3D object formats, comprising:
    receiving, by a digital 3D object processing apparatus, an instruction from a first outer computer;
    transmitting, by the digital 3D object processing apparatus, a control command to the first outer computer;
    establishing, by the first outer computer, a relative position of the plurality of sub-objects according to the control command; and
    transmitting, by the first outer computer, the relative position and the plurality of sub-objects to the digital 3D object processing apparatus,
    wherein the control command comprises a data division process, and the data division process comprises:
    taking at least one of the plurality of sub-objects as processed data, wherein the processed data has a data length and comprises a plurality of data pieces that are separated by a plurality of data partitions;
    obtaining a halfway point of the data length of the processed data;
    searching a first data partition and a second data partition of the plurality of data partitions, wherein the first data partition and the second data partition are closest to the half of the data length of the processed data, and the plurality of data pieces of the processed data are divided into a first sub-data before the first data partition, a second sub-data between the first and second data partitions, and a third sub-data after the second data partition; and
    taking the first sub-data and the third sub-data as the processed data, respectively, and repeating the above procedure until all data pieces of the processed data have been processed.

10. The digital 3D object processing method of claim 9, wherein the first outer computer establishes 3D representation of geometric data of the plurality of sub-objects according to the control command, and transmits the 3D representation of geometric data of the plurality of sub-objects to the digital 3D object processing apparatus.

11. The digital 3D object processing method of claim 10, further providing a preview image of the digital 3D object according to the relative position, the plurality of sub-objects, and the 3D representation of geometric data.

12. The digital 3D object processing method of claim 11, wherein the digital 3D object processing apparatus is further configured to:
   couple to a second outer computer through a network;
   receive a preview instruction and a download instruction from the second outer computer; and
   transmit the preview image and the digital 3D object to the second outer computer according to the preview instruction and the download instruction.

13. The digital 3D object processing method of claim 9, wherein the control command further establishes an application programming interface in the first outer computer, wherein the first outer computer establishes the relative position of the plurality of sub-objects through the application programming interface according to the control command, and transmits the relative position and the plurality of sub-objects to the digital 3D object processing apparatus.

14. The digital 3D object processing method of claim 9, wherein the digital 3D object processing apparatus further comprises:
   a storage unit, storing the relative position and the plurality of sub-objects.

15. The digital 3D object processing method of claim 9, further comprising:
   coupling the first outer computer to the second outer computer through the network; and
   transmitting the relative position and the plurality of sub-objects from the first outer computer to the second outer computer.

16. The digital 3D object processing method of claim 9, further comprising:
   converting, by the digital 3D object processing apparatus, a first digital 3D object format of the plurality of sub-objects into a second digital 3D object format of the plurality of sub-objects.

* * * * *